(12) United States Patent
Scherman et al.

(10) Patent No.: US 8,757,264 B2
(45) Date of Patent: Jun. 24, 2014

(54) VISCOUS WELLBORE FLUIDS

(75) Inventors: Oren A. Scherman, Cambridge (GB); Eric Appel, Cambridge (GB); Trevor Hughes, Cambridge (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 357 days.

(21) Appl. No.: 13/221,573

(22) Filed: Aug. 30, 2011

(65) Prior Publication Data
US 2012/0103615 A1   May 3, 2012

Related U.S. Application Data

(60) Provisional application No. 61/378,180, filed on Aug. 30, 2010.

(51) Int. Cl.
*E21B 43/16* (2006.01)
(52) U.S. Cl.
USPC ............... 166/305.1; 166/300; 166/308.2
(58) Field of Classification Search
USPC ............ 166/300, 305.1, 308.2; 507/219, 243, 507/242, 229; 525/7.4, 7.3, 54.1, 54.22, 60
See application file for complete search history.

(56) References Cited

U.S. PATENT DOCUMENTS

| 3,483,121 | A  | 12/1969 | Jordan |
| 4,986,354 | A  | 1/1991  | Cantu et al. |
| 6,579,947 | B2 | 6/2003  | Heitz et al. |
| 2009/0075845 | A1 | 3/2009 | Abad et al. |
| 2009/0126932 | A1 | 5/2009 | Robinson et al. |

FOREIGN PATENT DOCUMENTS

| WO | WO9322537   | A1 | 11/1993 |
| WO | WO02070861  | A1 | 9/2002  |
| WO | WO03106809  | A1 | 12/2003 |
| WO | WO2006075154| A1 | 7/2006  |
| WO | 2009071899  | A2 | 6/2009  |

OTHER PUBLICATIONS

Boal et al: "Self-assembly of nanoparticles into structured spherical and network aggregates"; Nature 2000, 404, 746-748.
Celiz et al: "Polymer-Mediated Dispersion of Gold Nanoparticles: Using Supramolecular Moieties on the Periphery"; Adv. Mater. 2009,21, 3937-3940.
Day et al: "Controlling Factors in the Synthesis of Cucurbituril and Its Homologues"; J Org. Chem. 2001, 66, 6094-8100.
Hunt et al: "Turnable, High Modulus Hydrogels Driven by Ionic Coacervation"; Adv. Mater. 2011, 23, 2327-2331.
Lange et al: "Hydrogen-bonded supramolecular polymer networks"; J. Poly. Sci. Part A: Poly. Chem. 1999, 37, 3657-3670.
Liu et al: "The Cucurbit[n]uril Family: Primer Components for Self-Sorting Systems"; J. Am. Chem. Soc. 2005, 127, 15959-15967.
Mock W L: "Cucurbituril"; Chapter 15 (pp. 477-493) in vol. 2 of Comprehensive Supramolecular Chemistry Atwood et al (eds); Pergamon Press, 1996.
Rolla et al: "Sodium borohydride reactions under phase-transfer conditions: reduction of azides to amines";, F. J. Org. Chem. 1982, vol. 47, pp. 4327-4329.
"Sijbesma et al: "Reversible Polymers Formed fromSelf-Complementary Monomers Using Quadruple Hydrogen Bonding"; Science 1997, 278, 1601-1604."
Whitesides et al: "Molecular Self-Assembly and Nanochemistry: A Chemical Strategy for the Synthesis of Nanostructures"; Science 1991, 254, 1312-1319.
Alvarez-Parrilla et al: "Supramolecular Linear Conglomerates Formed by beta-Cydodextrin Dimers and Sodium Deoxycholate"; Supramolecular Chemistry, 2002 vol. 14 (5), pp. 397-404.
Appel et al: "Supramolecular Cross-Linked Networks via Host-Guest Complexation with Cucurbit[8]uril"; J. Am. Chem. Soc. 2010, 132, 14251-14260.
Biedermann et al: "Postpolymerization Modification of Hydroxyl-Functionalized Polymers with Isocyanates"; Macromolecules 2011, 44, 4828-4835.
Bush et al: "Charge-Mediated Recognition of N-Terminal Tryptophan in Aqueous Solution by a Synthetic Host" J. Am. Chem. Soc. 2005, 127, 14511-14517.
Choi et al: "Synthesis of a novel poly(oxyethylene)-bridged b-cyclodextrin dimer"; J Incl Phenom Macrocycl Chem (2007) 57:257-260.
Coulston et al: "Supramolecular gold nanoparticle-polymer composites formed in water with cucurbit[8]uril"; Chem. Commun., 2011, 47, 164-166.
Crespo-Biel et al: "Expression of a Supramolecular Complex at a ultivalent Interface"; J. Am. Chem. Soc. 2006, 128, pp. 17024-17032.
Day et al: "Controlling Factors in the Synthesis of Cucurbituril and Its Homologues";, . Org. Chem. 2001, 66, 8094-8100.
"Deng et al: A Chemical-Responsive Supramolecular Hydrogel from ModifiedCyclodextrine""; Angew. Chem. Int. Ed. 2007, 46, 5144-5147".
Dreiss et al: "Formation of a Supramolecular Gel between r-Cyclodextrin and Free and Adsorbed PEO on the Surface of Colloidal Silica: Effect of Temperature, Solvent, and Particle Size"; Langmuir 2004, 20, 9124-9129.
Soster et al: "Metastable Supramolecular Polymer Nanoparticles via Intramolecular Collapse of Single Polymer Chains"; J. Am. Chem. Soc. 2009,131, 6964-6966.
Freeman et al: "Cucurbituril"; J. Am. Chem. Soc. 1981, 103, 7367-7368.

(Continued)

*Primary Examiner* — Angela M DiTrani
*Assistant Examiner* — Silvana Runyan (57) ABSTRACT

A wellbore fluid contains a viscosifying polymer in which portions of the polymer are connected through formation of an inclusion complex involving cucurbituril 8 (i.e. CB[8]) as host molecule. The fluid contains guest molecules with first and second guest groups covalently attached wherein at least one of the guest molecules comprises a polymer chain. The CB[8] host and the guest molecules attach together through reception of first and second guest groups within CB[8] host cavities, thereby connecting polymer chains together as a larger, supramolecular polymer and enhancing viscosity of the fluid. Polymer molecules may be synthetic polymers and guest groups may be attached to monomers before polymerization. Alternatively guest groups may be attached to existing polymers which may be polysaccharide.

7 Claims, 9 Drawing Sheets

(56) References Cited

OTHER PUBLICATIONS

"Gadde et al: ""Control of H- and J-Aggregate Formation via Host-GuestComplexation using Cucurbituril Hosts""; J. Am. Chem. Soc. 9 vol. 130, No. 50, 2008 17119".

"Gref et al: ""New self-assembled nanogels based on host—guest interactions:Characterization and drug loading""; Journal of Controlled Release 111 (2006) 316-324".

Harada et al: "Complex Formation between Poly(ethylene glycol) and alpha-Cyclodextrin"; Macromolecules 1990 23, 2823-2824.

"Hasegawa et al: ""Supramolecular Polymers Formed from beta-Cyclodextrins Dimer Linkedby Poly(ethylene glycol) and Guest Dimers""; Macromolecules 2005, 38, 3724-3730".

"Hashidzume et al: ""Interaction of cyclodextrins with side chains of water soluble polymers:A simple model for biological molecular recognition and its utilizationfor stimuli-responsive systems""; Polymer 47 (2006) pp. 6011-6027".

Heitmann et al: "Sequence-Specific Recognition and Cooperative Dimerization of N-Terminal Aromatic Peptides in Aqueous Solution by a Synthetic Host"; J. Am. Chem. Soc. 2006, 128, 12574-12581.

Hongliang et al: "Gel formation and photopolymerization during supramolecular self-assemblies of alpha-CDs with LA—REG—LA copolymer end-capped with methacryloyl groups"; European Polymer Journal 41 (2005) 948-957.

Isobe et al: "A Bulk Mixture System of Cyclodextrin and Amine-Terminated Polyether: Observation of Reversible Thermoswitching Behavior between Fluid and Gel-like States"; Macromolecules, vol. 39, No. 23, pp. 7783-7785 (2006).

Jeon et al: "Complexation of Ferrocene Derivatives by the Cucurbit[7]uril Host: A Comparative Study of the Cucurbituril and Cyclodextrin Host Families"; J. Am. Chem. Soc. 2005, 127, 12984-12989.

Jeon et al: "Control of the stoichiometry in host-guest complexation by redox chemistry of guests: Inclusion of methylviologen in cucurbit[8]uril"; Chem. Commun. , 2002, 1828-1829.

Jeong et al: Biodegradable block copolymers as injectable drug-delivery systems; Nature vol. 388 pp. 860-862 (1997).

Jiao et al: "A "green" method for isolation of cucurbit[7]luril via a solid state metathesis reaction"; Chem. Commun., 46, 2007-2009.

Kawabata et al: Bundling Two Polymeric Chains with gamma-Cyclodextrin Cavity Contributing to Supramolecular Formation; Macromolecules 2007, 40, 1011-1017.

Kim et al: "New Cucurbituril Homologues: Syntheses, Isolation, Characterization, and X-ray Crystal Structures of Cucurbit[n]urill (n ) 5, 7, and 8)"; J. Am. Chem. Soc. 2000,122, 540-541.

Ko et al: "Designed Self-Assembly of Molecular Necklaces Using Host-Stabilized Charge-Transfer Interactions"; J. Am. Chem. Soc. 2004,126, 1932-1933.

"Ko et al: "Exclusive Formation of 1:1 and 2:2 Complexes between Cucurbit[8]uril andElectron Donor-acceptor Molecules Induced by Host-stabilized ChargetransferInteractions""; Supramolecular Chemistry, vol. 19 (4-5), pp. 287-283 (2007).

Lee et al: "Cucurbituril Homologues and Derivatives: New Opportunities in Supramolecular Chemistry"; Acc. Chem. Res. 2003, 36, 621-630.

Leggio et al: "Study on the Structure of Host-Guest Supramolecular Polymers"; Macromolecules 2007, 40, 5899-5906.

Ma et al: "Aromatic—Aromatic Interactions Induce the Self-Assembly of Pentapeptidic Derivatives in Water to Form Nanofibers and Supramolecular Hydrogels "; J. Am. Chem. Soc. 2010, 132, 2719-2728.

Marquez et al: "Mechanism of Host-Guest Complexation by Cucurbituril"; J. Am. Chem. Soc. 2004, 126, 5808-5816.

Miyauchi et al: ""A [2]Rotaxane Capped by a Cyclodextrin and a Guest: Formation ofSupramolecular [2]Rotaxane Polymer""; J. Am. Chem. Soc. 2005, 27, 2034-2035.

"Miyauchi et al: ""Chiral Supramolecular Polymers Formed by Host-GuestInteractions""; J. Am. Chem. Soc. 2005, 217, 2984-2989".

Nepal et al: "The First Fullerene-Terminated Soluble Poly(azomethine) Rotaxane"; Macromolecules 2003, 36, 3800-3802.

Pinjari et al: "Molecular Electrostatic Potentials and Hydrogen Bonding in alpha-, beta-, and gamma-Cyclodextrins"; J. Phys. Chem. A 2006, 110, 13073-13080.

Rauwald et al: "Supramolecular Block Copolymers with Cucurbit[8]uril in Water"; Agnew. Int. Edit. 2008, 47, 3950-3953.

Reczek et al: "Multivalent Recognition of Peptides by Modular Self-Assembled Receptors"; J. Am. Chem. Soc. 2009, 131, 2408-2415.

Sangeetha et al: "Supramolecular gels: Functions and uses"; Chem. Soc. Rev., 2005, 34, 821-836.

Schappacher et al: "Molecular Containers Based on Amphiphilic PS-b-PMVE Dendigraft Copolymers: Topology, Organization, and Aqueous Solution Properties"; J. Am. Chem. Soc. 2005, 127, 2990-2998.

Scherman et al: "A Selectivity-Driven Supramolecular Polymerization of an AB Monomer"; Angew. Chem. Int. Ed. 2006, 45, 2072-2076.

Brunsveld et al: "Supramolecular Polymers"; Chem. Rev. 2001, 101, 4071-4097.

Yount et al: "Small-Molecule Dynamics and Mechanisms Underlying the Macroscopic Mechanical Properties of Coordinatively Cross-Linked Polymer Networks"; J. Am. Chem. Soc. 2005, 127, 14488-14496.

Zhang et al: "Molecular Recognition Remolds the Self-Assembly of Hydrogelators and Increases the Elasticity of the Hydrogel by 106-Fold"; J. Am. Chem. Soc. 2004,126, 15028-15029.

"Tellini et al: ""Thermodynamics of Formation of Host-Guest Supramolecular Polymers""; J. Am. Chem. Soc., 2006, 128 (17), pp. 5728-5734" plus supporting information available online.

"Tomatsu et al: Photoresponsive Hydrogel System Using Molecular Recognition ofalpha-Cyclodextrin""; Macromolecules 2005, 38, 5223-5227".

"Topchieva et al: ""Two-Phase Channel Structures Based onalpha-Cyclodextrin-Polyethylene Glycol Inclusion Complexes""; Langmuir 2004, 20, 9036-9043".

Dichtel et al: "Kinetic and Thermodynamioc Approaches for the Efficient Formation of Mechanical Bonds"; Accounts of Chemical research 41 pp. 1750-1761 (2008).

Sparge et al "Snthesis of Inorganic/Organic Host-Guest Hybrid material by Cationic Vinyl polymerization within Y Zeolites and MCM-41"; Chem. Materials vol. 13 pp. 3698-3708 (2001).

Cohen Stuart, et al: "Emerging applications of stimuli-responsive polymer materials"; Nature Materials 2010, 9, 101-113.

Dankers et al: "Supramolecular biomaterials. a modular approach towards tissue engineering"; Bull. Chem. Soc. Jpn. 2007, 80, 2047-2073.

De Greef et al: "Supramolecular Polymerization"; Chem. Rev. 2009,109, 5687-5754.

Deroo et al: "Discrete, multi-component complexes with cucurbit[8]uril in the gas-phase"; Chem. Commun. 2009, 644-646.

Feldman et al: "Model Transient Networks from Strongly Hydrogen-Bonded Polymers"; Macromolecules 2009, 42, 9072-9081.

Geng et al: "An Aqueous Supramolecular Side-Chain Polymer Designed for Molecular Loading"; Aust. J. Chem. 2010, 63, 627-630; together with supplementary information available online.

Isaacs, L: "Cucurbit[n]urils: from mechanism to structure and function"; Chem. Commun., 2009, 619-629.

Jongschaap et al: "A Generalized Transient Network Model for Associative Polymer Networks"; Macromolecules 2001, 34, 1031-1038.

Kim et al: "Growth of poly(pseudorotaxane) on gold using host-stabilized charge-transfer interaction"; Chem. Commun. 2004, 848-849.

Kim et al: "Inclusion of methylviologen in cucurbit[7]uril"; Proc. Natl. Acad. Sci. USA 2002, 99, 5007-5011.

Koopmans et al: "Formation of Physical Hydrogels via Host-Guest Interactions of β-Cyclodextrin Polymers and Copolymers Bearing Adamantyl Groups"; Macromolecules 2008, 41, 7418-7422.

Kretschmann et al: "Switchable Hydrogels Obtained by Supramolecular Cross-Linking of Adamantyl-Containing LCST Copolymers with Cyclodextrin Dimers"; Angew. Chem. Int. Edit. 2006, 45, 4361-4365.

(56) References Cited

OTHER PUBLICATIONS

Lagona et al: "The Cucurbit[n]uril Family"; Angew. Chem. Int. Edit. 2005, 44, 4844-4870.

Lee et al: "Unprecedented host-induced intramolecular charge-transfer complex formation"; Chem. Commun. 2002,2692-2693.

Lehn J-M: "Perspectives in supramolecular chemistry—From molecular recognition towards molecular information processing and self-organization"; Agnew. Chem. Int. Edit. 1990, 29, 1304-1319.

Lehn,, J. M. Supramolecular chemistry: concepts and perspectives; pp. 1-16, 29, 30, 161-185; Wiley VCH, 1995.

Leoni et al: "Solvent Effects in Radical Copolymerization IV. N-methyl acrylamide"; Makromol. Chem. 1973, vol. 165, pp. 97-104.

Liu et al: "Cyclodextrin-Modified Gold Nanospheres. Host-Guest Interactions at Work to Control Colloidal Properties"; J. Am. Chem. Soc. 1999, 121, 4304-4305.

Lutolf M. : "Spotlight on Hydrogels"; Nature Materials 2009, 8, 451-453.

Marquez et al: "Two Mechanisms of Slow Host-Guest Complexation between Cucurbit[6]uril and Cyclohexylmethylamine: pH-Responsive Supramolecular Kinetics"; Agnew. Chem. Int. Edit. 2001, 40, 3155-3160.

Moad et al: "Living Radical Polymerization by the RAFT Process—A First Update"; Aust. J. Chem. 2006, 59, 669-692.

Moad et al: "Toward Living Radical Polymerization"; Acc. Chem. Res. 2008, 41, 1133-1142.

Mock et al: "Dynamics of molecular recognition involving cucurbituril"; J. Am. Chem. Soc. 1989, 111, 2697-2699.

Mock et al: "Structure and Selectivity in Host-Guest Complexes of Cucurbituril"; J. Org. Chem. 1986, 51,4440-4446.

Mukhopadhyay et al: "High Fidelity Kinetic Self-Sorting in Multi-Component Systems Based on Guests with Multiple Binding Epitopes"; J. Am. Chem. Soc. 2006,128,14093-14102.

Ogoshi et al: "Side-Chain Polypseudorotaxanes with Heteromacrocyclic Receptors of Cyclodextrins (CDs) and Cucurbit[7]uril (CB7): Their Contrast Lower Critical Solution Temperature Behavior with α-CD, γ-CD, and CB7"; Macromolecules 2009, 42, 8003-8005.

Patra et al: "A Smart Supramolecular Hydrogel of Nβ-(4-n-Alkyloxybenzoyl)-l-histidine Exhibiting pH-Modulated Properties"; Langmuir 2010, 26, 7761-7767.

Peppas et al: "Physicochemical foundations and structural design of hydrogels in medicine and biology"; Annu. Rev. Eng. 2000, 2, pp. 9-29.

Rajgariah et al: "Scope of amino acid recognition by cucurbit[8]uril"; J. Incl. Phenom. Macro. Chem. 2008, 62, 251-254.

Rauwald et al: "Correlating Solution Binding and ESI-MS Stabilities by Incorporating Solvation Effects in a Confined Cucurbit[8]uril System"; J. Phys. Chem. B 2010, 114, 8606-8615.

Saini et al: "Solvent Effect in Radical Copolymerization I. Acrylamide"; Makromol. Chem. 1971, vol. 144, pp. 235-244.

Saini et al: "Solvent Effect in Radical Copolymerization II. N.N-Dimethyl Acrylarnide"; Makromol. Chem. 1971, vol. 146, pp. 165-171.

Seo et al: "Polymeric Nanoparticles via Noncovalent Cross-Linking of Linear Chains"; Macromolecules 2008, 41, 6413-6418.

Shown et al: "Synthesis of Cyclodextrin and Sugar-Based Oligomers for the Efravirenz Drug Delivery"; Macromol. Symp. pp. 51-59 (2010).

Skey et al: "Facile one pot synthesis of a range of reversible addition-fragmentationchain transfer (RAFT) agents"; Chem. Commun. 2008, 35,4183-4185.

Ten Brinke et al: "Supramolecular Materials Based on Hydrogen-Bonded Polymers"; Adv. Polym. Sci. 2007,207, 113-177.

Van Tomme et al: "Self-gelling hydrogels based on oppositely charged dextran microspheres"; Biomaterials 2005, 26, 2129-2135.

Wang et al: "Electrochemical Switching and Size Selection in Cucurbit[8]uril-Mediated Dendrimer Self-Assembly"; Angew. Chem. Int. Ed. 2006, 45, 7042-7046.

Wang et al: "High-water-content mouldable hydrogels by mixing clay and a dendritic molecular binder"; Nature vol. 463, pp. 339-343 Jan. 2010.

Wenz et al "Association Thickener by Host-Guest interaction of beta-Cyclodextrin Polymers and Guest Polymers" Chapter 16 (pp. 271-283) in "Associative Polymers in Aqueous Media" ACS Symposium Series 765 ed Glass J E, 2000.

Wojtecki et al: "Using the dynamic bond to access macroscopically responsive structurally dynamic polymers"; Materials 2010, 10, 14-27.

Wu et al: "Fabrication of Supramotecular Hydrogels for Drug Delivery and Stem Cell Encapsulation"; Langmuir 2008, 24; 10306-10312.

Wyman et al: "Host-Guest Complexes and Pseudorotaxanes of Cucurbit[7]uril with Acetylcholinesterase Inhibitors"; J. Org. Chem., 2009, 74 (21), pp. 8031-8038.

Xu et al: "Mechanism of Shear Thickening in Reversibly Cross-Linked Supramolecular Polymer Networks"; Macromolecules 2010, 43, 3556-3565.

Young et al: "Strong Means Slow: Dynamic Contributions to the Bulk Mechanical Properties of Supramolecular Networks"; Angew. Chem. Int. Edit. 2005, 44,2746-2748.

Zhao et al: "Azobenzene-Based Light-Responsive Hydrogel System"; Langmuir 2009, 25(15), 8442-8446.

Zhao et al: "Binding Studies on CB[6] with a Series of 1-Alkyl-3-methylimidazolium Ionic Liquids in an Aqueous System"; Chem-Asian J 2010, 5, 530-537.

HEC-Np

VISCOUS WELLBORE FLUIDS

FIELD OF THE INVENTION

This invention relates to viscosified fluids used in connection with wells drilled into subterranean locations. Such wells may be drilled for the purpose of exploration for and/or production of oil or gas. Such wells may also be used in connection with underground storage of carbon dioxide or used for other purposes where access to subterranean locations is required.

BACKGROUND OF THE INVENTION

In the recovery of hydrocarbons, such as oil and gas, from natural hydrocarbon reservoirs by means of drilled wells, extensive use is made of wellbore treatment fluids such as drilling fluids, completion fluids, work-over fluids, packer fluids, fracturing fluids, conformance or permeability control fluids and the like. Such fluids may be required to be more viscous than water. They may be required to develop viscosity over time or after a delay. For some applications, notably hydraulic fracturing, it is desirable to reduce the viscosity after the fluid has been placed below ground, so as to assist its removal after it has served its purpose.

It is commonplace to use water-based fluids, rendered viscous by the incorporation of a thickening agent, usually based on a polymer. Guar, which is a polysaccharide, is frequently used. Other polysaccharides have also been used and guar or other polysaccharides may be used in a chemically modified form. When a viscosifying polysaccharide is used alone, it enhances viscosity. When cross-linked, which is normally done with borate or metal ions, viscosity is increased considerably further. Cross-linking may occur after the fluid has been pumped down the wellbore: this is advantageous in that the viscosity of the fluid during pumping and during travel down at least part of the wellbore is less than the viscosity exhibited within the fluid reaches its underground destination.

Hydraulic fracturing involves breaking or fracturing a portion of the formation around the wellbore by injecting fluid at pressures sufficient to initiate and extend a fracture in the formation through which hydrocarbon can more easily flow to the wellbore. The viscosified fluid is also used to transport a particulate proppant into the fracture to keep the fracture from closing completely once the pumping operation is completed. It is desirable that the fluid loses its viscosity after fracture formation so that it can more easily flow back from the wellbore when gas or oil production starts or resumes. It is also desirable that the filtercake of thickening polymer which may form at the boundary of the fracture can be removed when no longer required. For these reasons it is normal to include a delayed-action polymer-degrading material in a fracturing fluid thickened with polymer.

As an alternative to polysaccharides as thickeners, WO 2002/070861 teaches that the polymer in a fracturing fluid may be a synthetic block copolymer. WO 2006/075154 also uses block copolymers with an objective that the viscosifying polymer will degrade into soluble fragments when no longer required. This document suggests that some of the blocks may be chemically modified polysaccharide: US2009/0126932 proposes to use the Diels-Alder reaction to couple a polymer to a cross-linking agent and/or use the reverse Diels-Alder reaction to uncouple a polymer from a cross-linking agent and thereby regulate the viscosifying effect of the polymer.

SUMMARY OF THE INVENTION

Broadly, the present invention provides a wellbore fluid comprising a viscosifying polymer in Which portions of the polymer are connected through formation of an inclusion complex involving cucurbituril 8.

In an inclusion complex, a host molecule has a size and shape such that it defines a cavity which receives at least part of another molecule referred to as the guest. The cavity provides an environment which differs from the solution outside the cavity and in consequence the guest molecule has an affinity for the host. The interactions between host and guest usually arise from relatively weak attractions and complex formation is reversible. Nevertheless the affinities between host and guest have frequently been found to be sufficient that complex formation takes place spontaneously, as soon as the parts of the complex are mixed together. When the guest is a small molecule, it may be enclosed within the host cavity. When it is a polymer, only a part of it may fit within the host cavity and the remainder of the polymer extends out into the surrounding solution.

Cucurbituril 8 (abbreviated to CB[8]) contains eight glycouril residues and defines a cavity large enough that two guest groups can be accommodated in the same cavity. It was described by Kim et al, J.A.C.S. vol 122, pages 540-541, 2000 and its structure can be depicted as Rauwald and Scherman, Angew. Chim. Int. Ed. Vol 47, pages 3950-53 (2008) and also WO 2009/071899 have disclosed the formation of block copolymers by formation of ternary inclusion complexes. Some polymer chains were terminated with methylviologen, which contains two pyridinium groups and has the formula and others were terminated with 2-naphthoxy groups having the formula On mixing in solution, a methylviologen end group and a 2-naphthoxy group entered the cavity of a cucurbituril [8] host and formed a charge transfer complex within the environment provided by the host molecule, thereby connecting the polymers into longer chains.

In one aspect this invention provides a wellbore fluid comprising an aqueous carrier liquid in which there are CB[8] molecules each providing a host cavity and further molecules comprising at least two groups receivable as guests within CB[8] host cavities, where at least one of the guest molecules contains a polymer chain and where the CB[8] and guest molecules attach together by formation of inclusion complexes with guest groups inserted within CB[8] host cavities. This leads to formation of a supramolecular polymer which contains longer and/or crosslinked polymer chains and which acts as a thickening agent. Some embodiments of the thickened fluids may display viscoelastic properties and may be immobile gels.

Aqueous liquids which have been thickened to a viscous state have a number of applications in connection with exploitation of oil and gas via a wellbore drilled to a subterranean reservoir. One application is in hydraulic fracturing where the fluid may be used to transport a particulate proppant into a fracture. Another application is gravel packing where a thickened fluid is used to transport particulate material into a region of a wellbore so that the gravel pack is positioned between the reservoir and a transport pipe into which the oil or gas flows. Further applications are thickened acidizing fluids, and fluids used to bring about diversion of flow or zonal isolation.

In a second aspect this invention provides a method of delivering a wellbore fluid below ground, comprising supplying, underground, an aqueous carrier liquid, CB[8] host molecules and guest molecules each comprising at least two guest groups, wherein at least one of the guest molecules comprises a polymer chain and the CB[8] and guest molecules attach together through reception of guest groups within CB[8] host cavities, thereby forming extended polymer chains and providing a viscosity enhancing polymer within the carrier liquid.

DETAILED DESCRIPTION

In this invention molecules with guest groups attached to them, generally attached by covalent bonds, become connected together through the formation of inclusion complexes in which two guest groups are received within a CB[8] host cavity. The guest groups received within a CB[8] host cavity preferably interact with each other within the hydrophobic environment provided by the CB[8] host cavity. The two groups within a single cavity may be different and so may conveniently be referred to as first and second guest groups, so that a first guest and a second guest group interact within a CB[8] host cavity.

The first guest groups do not need to be identical to each other: it is possible that a mixture of groups with similar characteristics may be employed as first guests. Likewise a mixture of second guests may be used. Where the first and second guests are mixtures it may be that any first guest can form an inclusion complex with any second guest.

First and second guest groups may be such that there is electrostatic interaction between them. They do not necessarily carry a net ionic charge but one guest group may be richer in electrons than the other so that there is some attraction between them. However it is possible that one guest group does carry a charge. For instance one guest group may contain positively charged pyridinium groups joined through conjugated (i.e. delocalized) bonds while a second guest group is a neutral aromatic group with at least two aromatic rings joined through conjugated bonds. Such a second guest would be electron rich relative to the positively charged first group and would interact with a first group within the CB[8] host cavity.

Formation of inclusion complexes serves to link together the molecules which have guest groups attached to them. It is possible that both first and second guest groups could be covalently attached to the same molecule. Conveniently, however, the fluid may comprise first guest molecules with first guest groups attached and second guest molecules with second guest groups attached and at least one of the first and second molecules is a polymer. It is possible that a guest molecule could comprise two guest groups joined by a relatively short, non-polymeric linking group, or could comprise three or more guest groups connected through a branched linking group. However, the guest molecules may both incorporate polymer chains. Such polymer chains may be wholly synthetic or may be of natural origin. The molecules which incorporate a polymer chain may have a high molecular weight such as a mean molecular weight of 1 million or more. One possibility is that some of the molecules are a natural high molecular weight polysaccharide to which guest groups are attached. Possible polysaccharides are guar, cellulose, xanthan, scleroglucan and chemically modified forms of such polymers which have additional chemical groups attached to the polymer chain. Guest groups may then be attached to such polymers, notably by reaction at hydroxyl groups present on the polymer. Synthetic polymers may also be used, notably polyethylene glycols and polyacrylamides. Polyacrylamides may be formulated to have cationic or anionic character if that is desired. Guest groups may be attached to such synthetic polymers by reaction after polymer synthesis or may be attached to monomers from which the polymer is subsequently made.

In this invention, especially when the wellbore fluid is a hydraulic fracturing fluid, the amount of the host and guest molecules together may be no more than 5% or 3% possibly no more than 1% or even no more than 0.5% by weight of the carrier liquid.

The molecules connected together by the formation of inclusion complexes constitute a supramolecular polymer which acts as a thickener to viscosify the aqueous fluid. Complex formation is a reversible process and although the affinities of guest groups for host cavities and for each other when inside the host cavity may strongly favour complex formation, we have found that the guest groups can be displaced from the host cavity by a competitive material which has high affinity for the host cavity. Some aromatic compounds display such affinity.

This leads to the possibility that a viscosfied aqueous fluid could be "broken", that is to say reduced in viscosity, by introducing a competitor for the CB[8] cavities. A related possibility is that a viscous fluid embodying this invention could lose its viscosity on contact with hydrocarbon oil having a content of aromatic hydrocarbons. Thickened fluids which lose their viscosity on contact with oil (described as "responsive to oil") can be used for control of water penetration or to deliver a scale inhibitor or other chemicals selectively into the hydrocarbon containing zones of a reservoir. Thickened fluids can be used to plug unwanted flow paths, for example to stop fluid loss or to isolate one zone from another.

Reception of guest groups in CB[8] host cavities may take place spontaneously on mixing the host and guest molecules, so that the long and/or cross-linked supramolecular polymer chains self assemble. However, in order to facilitate delivery to an underground location and avoid the energy consuming task of pumping a very viscous composition all the way down the well bore, it may be desirable to delay self-assembly of the CB[8] and guest molecules until they have been transported some way down the wellbore towards the underground location where viscosity is required.

This may be useful in a number of applications but it is particularly envisaged as valuable in the course of hydraulic fracturing where the energy to pump the fluid is a significant cost and maintaining low viscosity until the fluid arrives at the fracture, or is close to it, gives a significant saving.

One approach to delaying self assembly of the CB[8] and guest molecules makes use of the difference between surface temperatures and temperatures below ground, which are almost always higher than at the surface. During transit to the subterranean location, the carrier liquid and everything suspended in it will pass through a wellbore exposed to subterranean temperatures and will begin to heat up, but if the flow rate is substantial, the flowing composition will reach the subterranean location at a temperature well below the natural temperature at that location. In particular, in the case of hydraulic fracturing the fracturing fluid will leave the wellbore and enter the fracture at a temperature significantly below the reservoir temperature.

One way to make use of this temperature difference is to encapsulate the CB[8] molecules or at least one of the guest molecules within a substance which is solid at surface temperature but which melts to a liquid at the downhole temperature. One example of such a material is eicosane which melts at 35 to 37° C. Various grades of paraffin wax, melting at temperatures from 35 to 60° C., are available commercially.

Encapsulation of either the host or guest molecules to delay release and prevent them from contacting each other prematurely could also be carried out with an encapsulating material which dissolves slowly or undergoes chemical degradation under conditions encountered at the subterranean location, thereby leading to rupture of the encapsulating shell or making the encapsulating material permeable. Degradation may in particular be hydrolysis which de-polymerises an encapsulating polymer. While such hydrolytic degradation may commence before the overall composition has traveled down the wellbore to the reservoir, it will provide a delay before the hoist and guest molecules contact each other.

A number of technologies are known for the encapsulation of one material within another material. Polymeric materials have frequently been used as the encapsulating material. Some examples of documents which describe encapsulation procedures are U.S. Pat. No. 4,986,354, WO 93/22537, and WO 03/106809. Encapsulation can lead to particles in which the encapsulated substance is distributed as a plurality of small islands surrounded by a continuous matrix of the encapsulating material. Alternatively encapsulation can lead to core-shell type particles in which a core of the encapsulated substance is enclosed within a shell of the encapsulating material. Both core-shell and islands-in-matrix type encapsulation may be used.

An encapsulating organic polymer which undergoes chemical degradation may have a polymer chain which incorporates chemical bonds which are labile to reaction, especially hydrolysis, leading to cleavage of the polymer chain. A number of chemical groups have been proposed as providing bonds which can be broken, including ester, acetal and amide groups. Cleavable groups which are particularly envisaged are ester and amide groups both of which provide bonds which can be broken by a hydrolysis reaction.

Generally, their rate of cleavage in aqueous solution is dependent upon the pH of the solution and its temperature. The hydrolysis rate of an ester group is faster under acid or alkaline conditions than neutral conditions. For an amide group, the decomposition rate is at a maximum under low pH (acidic) conditions. Low pH, that is to say acidic, conditions can also be used to cleave acetal groups.

Thus, choice of encapsulating polymer in relation to the pH which will be encountered after the particles have been placed at the intended subterranean location may provide a control over the delay before the encapsulated material is released. Polymers which are envisaged for use in encapsulation include polymers of hydroxyacids, such as polylactic acid and polyglycolic acid. Hydrolysis liberates carboxylic acid groups, making the composition more acidic. This lowers the pH which in turn accelerates the rate of hydrolysis. Thus the hydrolytic degradation of these polymers begins somewhat slowly but then accelerates towards completion and release of the encapsulated material.

Another approach to delaying self assembly of the host and guest molecules is physical separation of flow. The components of the wellbore fluid are transported down the wellbore as two separate streams. One stream comprises the CB[8] molecules (and possibly one of the guest molecules) and some of the carrier liquid while the other stream comprises at least one of the guest molecules and the remainder of the carrier liquid. These two streams are transported by separate flow paths within the wellbore. This could be achieved by using coiled tubing within a wellbore to deliver one of the two streams while using the annulus around the coiled tubing as the flow path for the other of the two streams.

It may be arranged that larger molecules are carried by a major proportion of the aqueous liquid. Thus one flow stream may comprise at least 75% of the carrier liquid and contain at least one of the guest molecules which include a polymer chain and which are of higher molecular weight than the counterpart guest or host molecules in the other flow stream.

Transporting the CB[8] and guest molecules separately could also be used to create barriers below ground. This could be done by incorporating part of the ternary complex of CB[8] and guest molecules in a fluid placed below ground and then delivering the remainder of the complex through a delivery conduit to form a viscous gel, acting as a barrier to flow, at the exit from the delivery conduit.

For some applications, notably hydraulic fracturing, it is desirable that the liquid eventually loses its viscosity, facilitating its removal. For this invention it may be arranged that the links through which guest groups are attached to each other or to a polymer chain are such that they can be broken by reaction: for example by oxidation or hydrolysis. A breaker material, such as an oxidizing agent or a material to change the pH of the composition and thereby promote hydrolytic cleavage of the links may then be incorporated in the wellbore fluid, so that the extended or cross-linked polymer which increases viscosity has a limited life.

The following description describes, by way of example only, synthesis of polymers with guest groups covalently attached to the polymer chain, modification of polymers to introduce guest groups and the preparation of supramolecular polymers through host-guest interaction.

Example 1

This example illustrates the synthesis of polymers with electron-poor methylviologen (MV) first guest groups covalently attached to the polymer chain. The reaction scheme is shown as FIG. 1. The polymers were prepared by free radical polymerization. A styrenic monomer bearing an MV moiety (STMV, compound 1) was easily synthesized from 4-vinylbenzylchloride and methyl bipyridine in good yield. This material was then copolymerized with various water-soluble comonomers.

Figure 1:
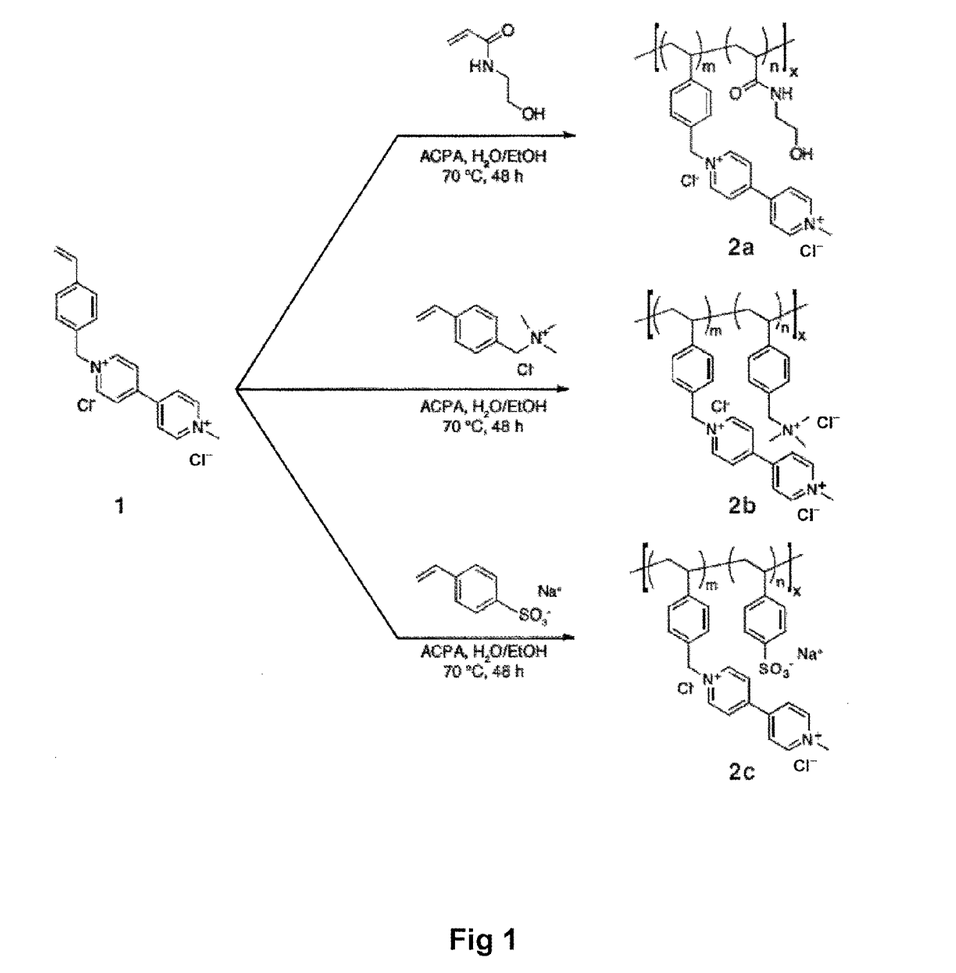
FIGS. 1 to 3 show reaction schemes for the preparation of guest molecules.

A positively charged copolymer 2b was prepared by reaction of SMTV and (vinylbenzyl)trimethyl-ammonium chloride (SAM), as also shown in FIG. 1. The reagents used to carry out this polymerization were 0.35 gm (0.78 mmol) STMV, 1.47 gm (6.99 mmol) (vinylbenzyl)trimethylammonium chloride (SAM) and 10.9 mg (38.9 mmol) 4,4'-Azobis(4-cyanopentanoic acid) (ACPA, Sigma-Aldrich).

These were dissolved in a 1:1 (v/v) mixture of deionized water and ethanol (5.2 mL) in a schlenk tube and the solution was degassed by bubbling nitrogen for 30 min. The schlenk tube was then sealed and heated in an oil bath set to 70° C. for 48 h. The reaction was quenched in liquid nitrogen and the polymer isolated by precipitation from cold diethyl ether, filtering and drying under vacuum. The product was obtained as a yellow amorphous solid (1.75 g, 96%). 1H-NMR Spectroscopy ($D_2O$, 500 MHz) d (ppm)=9.18-8.88 (4H, br, MV aryl-H), 8.60-8.33 (4H, br, MV aryl-H), 7.73-6.11 (18.8H, br, St-H), 5.96-5.58 (2H, br, MV-$CH_2$), 4.64-3.98 (18.7H, br, MV-$CH_3$ and St-$CH_2$-AM), 3.24-0.3 (107.3H, br, polymer backbone). Gel permeation chromatography ($H_2O$): Mn (PDI)=37.1 kDa (2.42).

A similar procedure was used for reaction with N-hydroxyethylacrylamide as a neutral, water soluble comonomer to prepare copolymer 2a which contained approximately 10 mol % loading of the STMV monomer and to produce a negatively charged copolymer 2c by reaction with styrene sulfonate as comonomer.

Example 2

Figure 2:
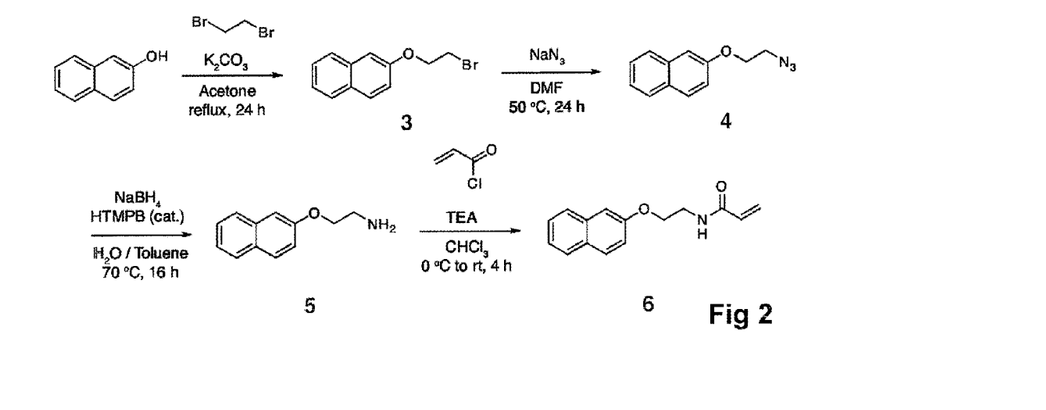
Figure 3:
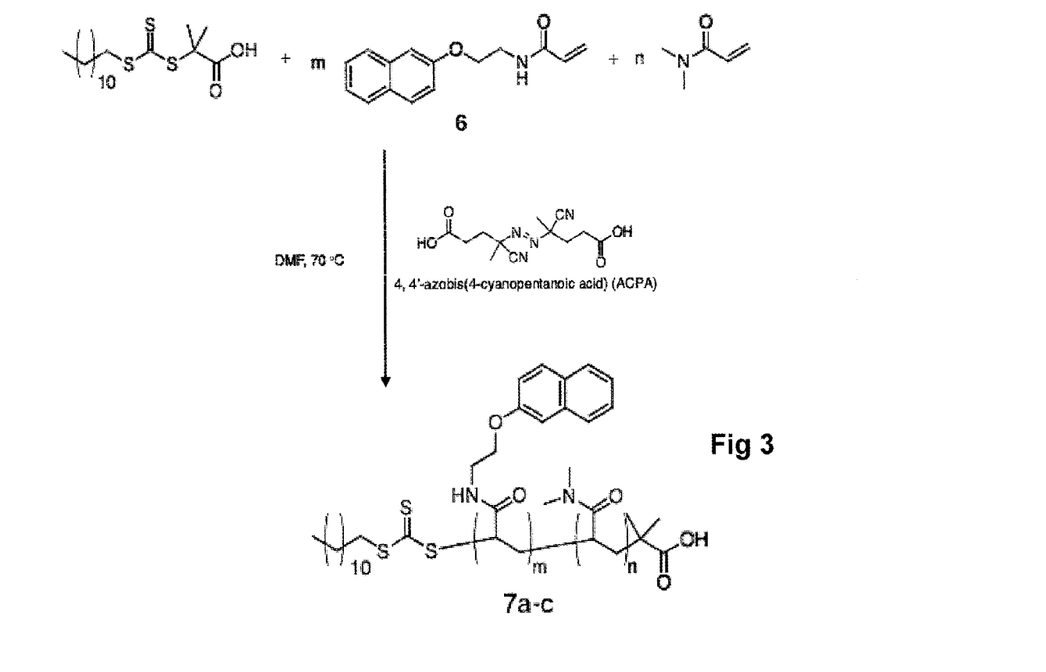

This example illustrates the synthesis of polymers containing 2-naphthyl second guest groups. FIGS. 2 and 3 show the synthetic route. An acrylamide monomer (compound 6) was first prepared from 2-naphthol, by the multi-step route shown in FIG. 2.

In the first step, 2-(2-bromoethoxy)naphthalene (compound 3) was prepared by adding a solution of 2-naphthol (10.00 g, 69.4 mmol) in acetone (100 mL) to a flask containing a large excess of 1,2-dibromoethane (65.20 g, 346.8 mmol) in the presence of potassium carbonate and stirring at reflux for 72 h. The reaction mixture was extracted into dichloromethane (2×400 mL) from 1M HCl (400 mL). The combined organic extracts were washed with water (400 mL) and brine (400 mL). The organic layer was dried over MgSO4 and the solvent removed under reduced pressure yielding a brownish oil. The oil was dissolved in ethyl acetate (10 mL) and petroleum ether (40:60) was added to precipitate out the product, which was filtered and dried under vacuum to afford a white crystalline solid (11.67 g, 67%). 1H-NMR Spectroscopy ($CDCl_3$, 400 MHz) d (ppm)=7.73-7.65 (3H, m, Np-H), 7.38 (1H, m, Np-H), 7.29 (1H, m, Np-H), 7.12-7.07 (2H, m, Np-H), 4.33 (2H, t, Np-O—$CH_2$—$CH_2$—Br), 3.66 (2H, t, Np-O—$CH_2$—$CH_2$—Br).

13C-NMR Spectroscopy ($CDCl_3$, 125 MHz) d (ppm) =156.5, 134.8, 130.1, 129.7, 128.1, 127.2, 126.9, 124.4, 119.2, 107.6, 68.3, 29.5.

FT-IR (ATR) n=3055, 2946, 2862, 1628, 1591, 1456, 1424, 1381, 1353, 1256, 1216, 1178, 1073, 1013, 955 $cm^{-1}$.

2-(2-azidoethoxy)naphthalene (compound 4) was prepared by dissolving compound 3 (5.00 g, 19.9 mmol) and sodium azide (1.42 g, 21.9 mmol) in DMF (100 mL) and stirring at 50° C. for 24 h. The reaction mixture was then diluted with water (300 mL) and extracted with diethyl ether (3×100 mL). The combined organic extracts were washed with water (3×100 mL) and brine (100 mL). The organic layer was dried over MgSO4 and the solvent was removed under reduced pressure to afford a white crystalline solid (4.12 g, 97%). 1H-NMR Spectroscopy ($CDCl_3$, 400 MHz) d (ppm) =7.85-7.80 (3H, m, Np-H), 7.45-7.48 (1H, m, Np-H), 7.34-7.37 (1H, m, Np-H), 7.17-7.19 (2H, m, Np-H), 4.28-4.30 (2H, t, Np-O—CH2-CH2-N3), 3.71-3.73 (2H, t, Np-O—$CH_2$—$CH_2$—$N_3$).

13C-NMR Spectroscopy ($CDCl_3$, 125 MHz) d (ppm) =156.0, 134.3, 129.6, 128.7, 127.6, 126.8, 126.6, 123.9, 118.5, 107.1, 66.9, 49.6.

FT-IR (ATR) n=3050, 2940, 2102, 1628, 1599, 1509, 1456, 1381, 1354, 1256, 1215, 1178, 1059, 1012, 963 $cm^{-1}$.

The next step was preparation of 2-(naphthalen-3-yloxy)ethanamine (compound 5) by sodium borohydride reduction under phase transfer conditions adopted from a literature method by Rolla (J. Org. Chem. Vol 47 pages 4327-4329, 1984). Compound 4 (1.00 g, 4.7 mmol) and (nhexadecyl)-tri-n-butyl-phosphonium bromide (0.24 g, 0.5 mmol) were dissolved in toluene (5 mL). Sodiumborohydride (0.53 g, 14.1 mmol) in $H_2O$ (1.5 mL) was added dropwise at 70° C. and the solution was stirred overnight. The organic layer was separated and extracted with aqueous HCl (10%, 10 mL) and the toluene/aqueous mixture was filtered and the cake washed with ether. The cake was then collected and added to aqueous. KOH (10%, 25 mL) and extracted with ether (3×20 mL). The organics were combined and washed with brine (25 mL), dried over MgSO4, and the solvent was removed under reduced pressure to afford a yellow oil. The oil was then dissolved in DCM (5 mL) and filtered through a 0.2 mm PTFE microfilter and the solvent removed under pressure to yield a yellow solid (0.79 g, 90%).

1H-NMR Spectroscopy ($CDCl_3$, 400 MHz) d (ppm)=7.82-7.71 (3H, m, Np-H), 7.48 (1H, m, Np-H), 7.38 (1H, m, Np-H), 7.24-7.16 (2H, m, Np-H), 4.15 (2H, t, Np-O—CH2-CH2-NH2), 3.18 (2H, t, Np-O—CH2-CH2-NH2).

13C-NMR Spectroscopy ($CDCl_3$, 125 MHz) d (ppm) =157.3, 135.0, 129.8, 129.4, 128.1, 127.2, 126.8, 124.3, 119.3, 107.2, 70.6, 42.0.

FT-IR (ATR) n=3367, 3049, 2921, 2858, 1627, 1599, 1508, 1457, 1388, 1353, 1256, 1215, 1178, 1118, 1010, 959 $cm^{-1}$.

Preparation of naphthol-acrylamide monomer (compound 6) was accomplished with acryloyl chloride in the presence of triethylamine under standard amide coupling conditions. Compound 5 (2.00 g, 10.7 mmol) and triethylamine (1.62 g, 16.0 mmol) were dissolved in dry, degassed dichloromethane and cooled in an ice/water bath. Acryloyl chloride (1.16 g, 12.8 mmol) was then added dropwise under nitrogen. The bath was removed and the reaction mixture was allowed to stir for 16 h at room temperature. The solvent was removed under reduced pressure and the residue purified by column chromatography on silica gel using a 2:3 mixture of ethyl acetate: petroleum ether (40:60) to afford N-(2-(naphthalen-2-yloxy) ethyl)acrylamide (compound 6) as a yellow oil (2.19 g, 85%). 1H-NMR Spectroscopy (CDCl$_3$, 400 MHz) d (ppm)=7.82-7.71 (3H, m, Np-H), 7.48 (1H, m, Np-H), 7.38 (1H, m, Np-H), 7.24-7.16 (2H, m, Np-H), 6.31 (1H, d, AM), 6.17 (1H, m, AM), 5.69 (1H, d, AM), 4.21 (2H, t, Np-O—CH$_2$—CH$_2$—NH$_2$), 3.87 (2H, t, Np-O—CH$_2$—CH$_2$—NH$_2$).

13C-NMR Spectroscopy (CDCl$_3$, 125 MHz) d (ppm) =165.66, 156.35, 134.46, 130.63, 129.59, 129.16, 127.65, 126.89, 126.83, 126.55, 123.91, 118.47, 106.94, 66.78, 39.06.

FT-IR (ATR) n=3295, 2921, 1675, 1628, 1529, 1457, 1388, 1353, 1256, 1215, 1178, 1121, 1041, 967 cm$^{-1}$. Elemental. Found C, 74.18; H, 6.22; N, 5.52. C$_{15}$H$_{15}$NO$_2$ required C, 74.67; H, 6.27; N, 5.81.

As shown in FIG. 3, compound 6 was copolymerized with dimethylacrylamide (DMA). Reversible addition-fragmentation chain transfer (RAFT) polymerization was used for this. Three multivalent, naphthol-functional copolymers were prepared using a well known trithiocarbonate based chain transfer agent (CTA) 2-(dodecanethiocarbonothioylthio)-2-methylpropanoic acid (DDMAT; see Skey and O'Reilly, Chem. Commun. Vol 35, pages 4183-85, 2008) under standard RAFT conditions in dimethylformamide. DDMAT was used as it successfully mediates the polymerization of a wide variety of monomers (styrenics, (meth)acrylates, and (meth)acrylamides) in a variety of solvent conditions with high control over molecular weight and yielding low polydispersities (PDI). Three polymers 7a-c with varying molecular weights ranging from 10 kDa to 22 kDa and loadings of functional monomer 6 ranging from 5 to 10% were prepared.

Polymer 7b was prepared using the following materials:
naphthol-acrylamide monomer 6 (0.128 g, 0.5 mmol, M/CTA=5),
DDMAT (37.8 mg, 106 mmol),
dimethylacrylamide (1.00 g, 10.1 mmol, M/CTA=95) and
4,4'-azobis(4-cyanopentanoic acid) (ACPA) (5.9 mg, 21 mmol).

These materials were dissolved in dimethylformamide (DMF) (5.0 mL) in a schlenk tube and the solution was degassed by bubbling nitrogen for 30 min (overall M/CTA=100). The schlenk tube was then sealed and heated in an oil bath set to 70° C. for 12 hours. Aliquots were removed periodically to analyze conversion. The reaction was quenched in liquid nitrogen and the polymer isolated by precipitation from cold diethyl ether, filtering and drying under vacuum. The polymer was obtained as a yellow amorphous solid (1.11 g, 95%). 1H-NMR Spectroscopy (MeOD, 500 MHz) d (ppm)=7.89-7.62 (58.5H, br, Np-H), 7.52-7.04 (77.7H, br, Np-H), 5.15-2.02 (2H, br, S—CS$_2$—CH$_2$), 4.29-3.92 (36.3H, br, Np-O—CH$_2$), 3.68-3.19 (33.16H, br, —CH$_2$—NHCO—), 3.18-1.86 (1812.9H, br, polymer backbone), 1.85-0.66 (544.6H, br, polymer backbone). GPC (DMF): Mn (PDI)=10.1 kDa (1.12).

Polymers 7a and 7c were prepared in similar manner. The properties of the various polymers prepared in this Example and the preceding Example were:

| Polymer | Functionality (%) | Mn (kDa) | Polydispersity (PDI) |
|---|---|---|---|
| 2a | 10.1 | 27.4 | 1.53 |
| 2b | 10.0 | 37.1 | 2.42 |
| 2c | 9.8 | 26.8 | 2.09 |
| 7a | 4.3 | 10.1 | 1.11 |
| 7b | 10.1 | 10.1 | 1.12 |
| 7c | 4.6 | 21.8 | 1.15 |

Notes:
Functionality is the mol % of the comonomer bearing a guest group, as determined by 1H NMR. Mn and PDI were determined by gel permeation chromatography (GPC). For compounds 2a to 2c the eluent was H2O. For compounds 7a to 7c the eluent was DMF.

Example 3

Formation of a gel using polymers 2b and 7b together with CB[8] was carried out as follows. An aqueous solution was made by dissolving the MV-functional polymer 2b (50 mg, 21.2 mmol MV) and CB[8] (18 mg, 10.6 mmol, 5% crosslink density) in water (0.75 mL) with sonication for 10 min. The water soluble polymer had the effect of aiding dissolution of CB[8] which would not dissolve on its own. A second solution was made by dissolving the naphthyl-functional polymer 7b (24 mg, 21.2 mmol Np) in water (0.75 mL). The solution of Np-polymer 7b was then added to the solution of 2b/CB[8] in a small screw top vial and shaken for approximately 2 seconds. A red viscous gel formed. The bright red color is characteristic of the formation of a charge-transfer complex between the electron-poor MV and the electron-rich Np moieties within the cavity of the host molecule. The viscosity of the gel was sufficiently high that the gel did not fall within the vial when the vial was inverted. This high viscosity was obtained at 5 wt % in water and only requiring 5% crosslink density through addition of 0.5 equivalents of CB[8] with respect to MV and Np functional groups By contrast, solutions of 2b alone, 7b alone and a 1:1 mixture of 2b and 7b without CB[8] were all mobile fluids.

Several 1:1 combinations of polymers were made into gels in similar fashion. Their viscosities were measured at zero shear by steady shear rate sweep performed at 25° C. and the results are set out in the following table.

| MV Polymer | Np Polymer | % Crosslinking | Conc. (wt %) | Viscosity (Pa · s) |
|---|---|---|---|---|
| 2a | 7b | 5 | 6.6 | 8.7 |
| 2b | 7b | 5 | 5 | 21 |
| 2c | 7b | 5 | 6.6 | 0.061 |
| 2b | 7a | 5 | 5 | 5.4 |
| 2b | 7c | 5 | 5 | 19 |

Note:
% Crosslinking is the % of monomer units participating in crosslink formation and is determined by the molar equivalent addition of CB[8], therefore 5% crosslinking is achieved via addition of 0.5 equivalents of CB[8] relative to functional monomer incorporation.

As polymers 7a and 7c both have lower concentrations of Np functionality (5% functional monomer), the overall viscosities were lower when compared to 7b as the concentration of ternary complexes were lower in the network. The 21.8 kDa polymer 7c also exhibited increased viscosity over 7a as the polymer contains twice as many crosslinks per chain compared with 7a (9.2 and 4.3, respectively) and is twice the molecular weight (21.8 and 10.1 kDa, respectively). These results clearly indicate that both the density of crosslinks and polymer molecular weight affect the material properties.

In the case of the negatively charged styrene sulfonate copolymer 2c with 7b the characteristic red color was only faintly observed and only a portion of the CB[8] added to the solution dissolved, identifying that the negatively charged polymer backbone was interfering with complexation with the pendant MV moieties, decreasing the propensity for ternary complex formation and providing no increase in solution viscosity.

Figure 4:
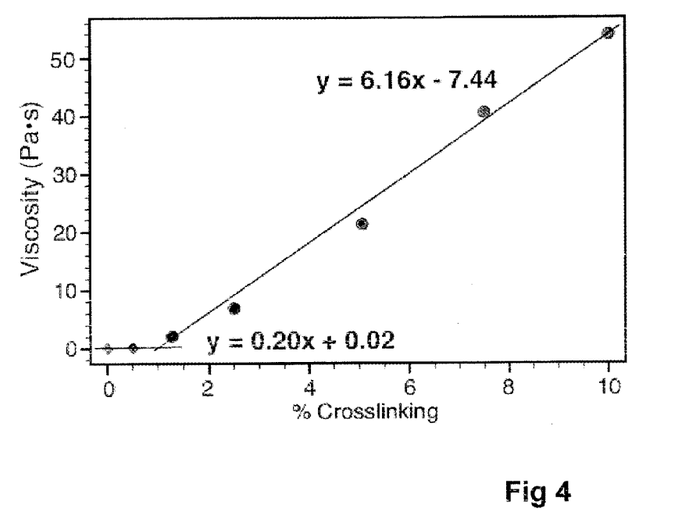
FIG. 4 is a graph of viscosity against CB[8] concentration.

As the mixture of cationic polymer 2b and 7b with CB[8] (2b/7b/CB[8]5%) yielded the supramolecular hydrogels with the greatest viscosity, further rheological analysis was performed at 5 wt % in water with variable amounts of CB[8]. Steady shear analysis revealed dramatic increases (>103) in viscosity upon addition of CB[8] on account of 3D network formation. The viscosities of the 3D networks were observed to range between 5-55 Pa·sec and increase linearly with crosslink density (and therefore with CB[8] concentration) from 2.5% to 10% as shown by FIG. 4.

Figure 5:
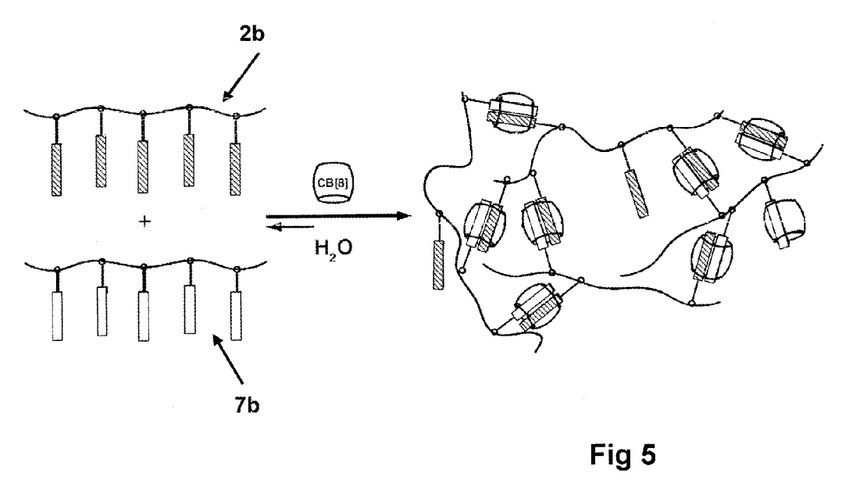
FIG. 5 diagrammatically illustrates cross-linking through host-guest interaction.

FIG. 5 illustrates cross linking by the formation of inclusion complexes. A guest polymer such as polymer 2b has a backbone with side chains which incorporate guest groups represented as cross hatched rectangles. A second guest polymer such as 7b incorporates guest groups represented as open rectangles. In the presence of CB[8], ternary complexes are formed with guest groups (one cross hatched rectangle and one open rectangle) in a CB[8] barrel.

Example 4

Figure 6:
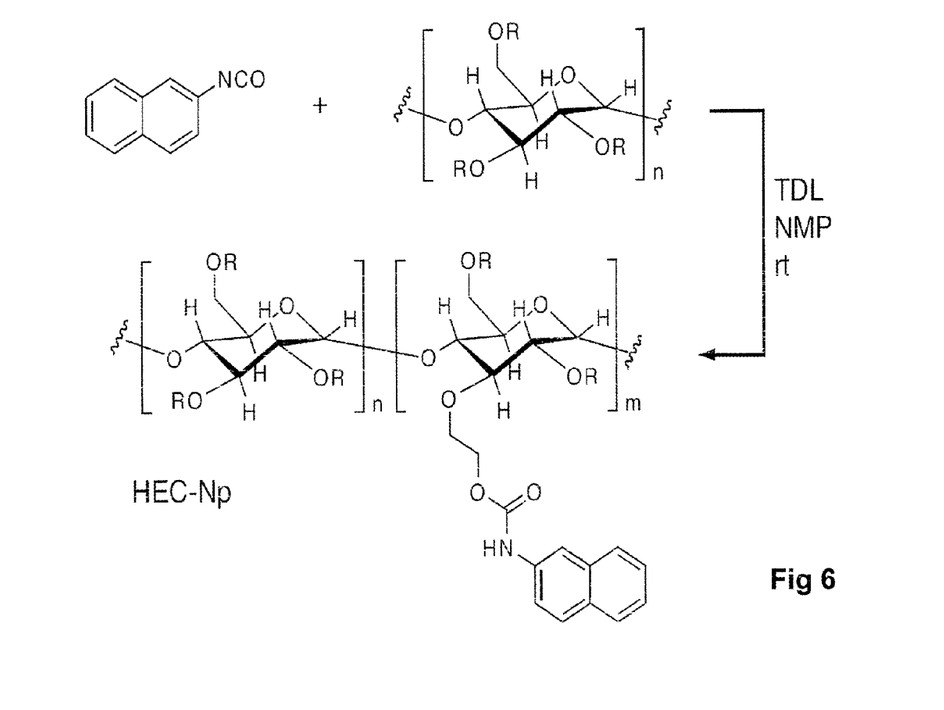
FIG. 6 shows a reaction scheme for attachment of a guest group to a polysaccharide.

This example illustrates the attachment of 2-naphthyl guest groups to a modified polysaccharide molecule. The reaction scheme is shown as FIG. 6. This reaction uses 2-naphthyl isocyanate which may be prepared as described in Biedermann et al *Macromolecules* 2011, vol 44, pages 4828-4835 and also uses commercially available hydroxyethyl cellulose having hydroxyethyl resides attached to the glucose rings of the cellulose chain.

Hydroxyethyl cellulose (HEC, 1 gm) which had been dried overnight under vacuum was dissolved in N-methylpyrrolidone (NMP, 150 ml) at 110° C. and then cooled to room temperature. 2-naphthyl isocyanate (Np-NCO, 29.7 mg, 0.18 mmol) together with dibutyltin dilaurate (TDL, 3 drops) as catalyst were added and the mixture stirred at room temperature overnight. The product, denoted HEC-Np, was hydroxyethyl cellulose with naphthyl groups covalently attached through carbamate groups to approximately 5% of the glucose rings of the HEC. This is approximately 200 naphthyl groups per polymer molecule. This product was precipitated by pouring the reaction mixture into acetone, filtered off and dried overnight. Its molecular weight and polydispersity, determined by GPC with water as eluent were Mn=3.4 MDa and PDI=1.25.

Example 5

Figure 7:
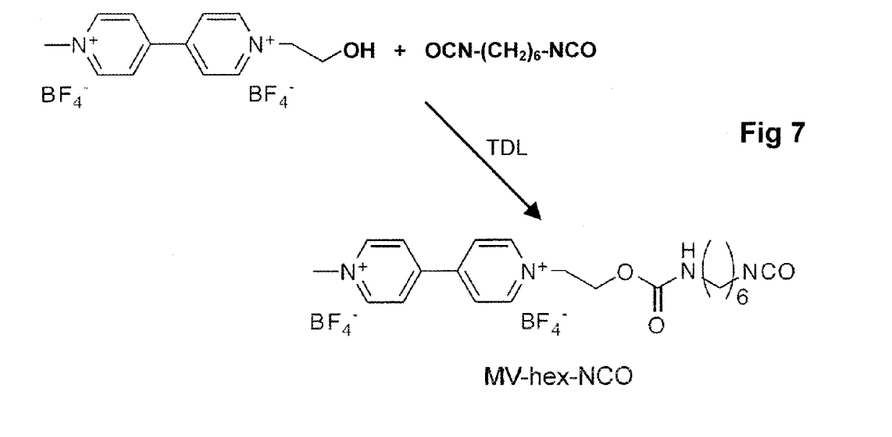
FIG. 7 shows the preparation of an intermediate in which a methylviologen group is coupled to a reactive isocyanate group.
Figure 8:
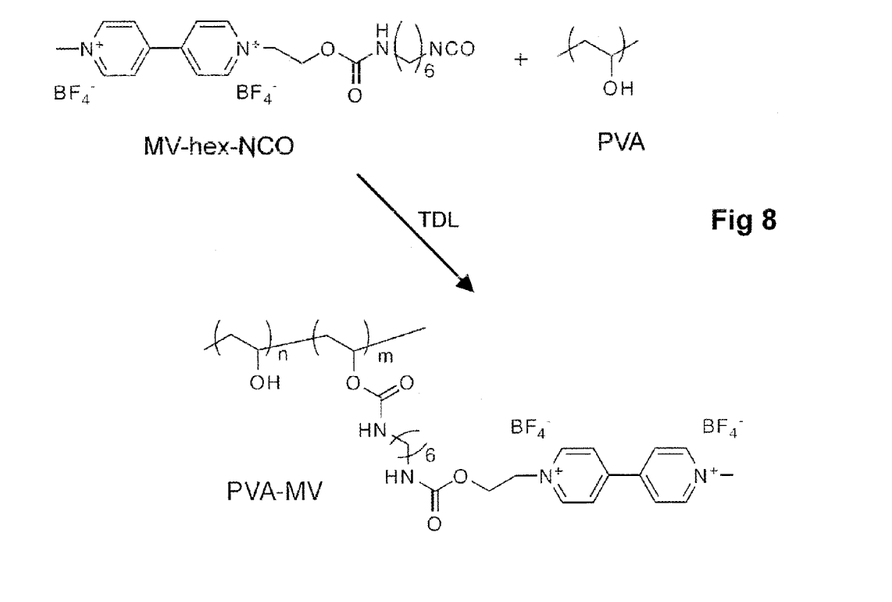
FIG. 8 shows a reaction scheme for attachment of the intermediate of FIG. 7 to polyvinyl alcohol.

This example illustrates the attachment of methylviologen guest groups to a polyvinylalcohol molecule. As shown in FIG. 7, a methyl viologen compound is first reacted with one of the isocyanate groups of 1,6-hexamethylene diisocyanate to form an intermediate in which methylviologen is coupled to a reactive isocyanate group as described in Biedermann et al above. This intermediate is then reacted with polyvinylalcohol as shown in FIG. 8.

Referring to FIG. 7, as described in the above paper, 1-(2-hydroxyethyl)-1'-methyl-[4,4'-bipyridine]-1,1'-diium di(hexafluorophosphate) (0.5 g, 1.0 mmol) was dissolved in 200 mL anhydrous acetonitrile. Excess 1,6-hexamethylene diisocyanate (2 mL) and a drop of dibutyltin dilaurate as catalyst were added. The reaction mixture was stirred for 24 hours at room temperature. The solvent was evaporated under reduced pressure to approx. 10 mL and 200 mL of anhydrous diethylether was added. A sticky, yellowish precipitate formed and the mixture was chilled in a freezer for 30 min. Then the solvent was decanted and the residue redissolved in a minimum amount of anhydrous acetonitrile. Precipitation by addition of 200 mL of anhydrous diethylether, chilling and decantation of the solvent was repeated twice and the yellowish, sticky solid was dried under reduced pressure to yield the intermediate product designated MV-hex-NCO (0.6 g, 87%). As can be seen, this intermediate has methyl viologen connected by a carbamate group and a six carbon chain to a reactive isocyanate group Referring to FIG. 8, polyvinylalcohol (PVA 1 gm) with molecular weight Mn approximately 205 kDa which had been dried overnight was dissolved in N-methylpyrrolidone (NMP, 60 ml). MV-Hex-NCO (0.63 g, 1.13 mmol) and dibutyltin dilaurate (3 drops) were added and the mixture stirred at room temperature overnight. The product, designated PVA-MV was polyvinylalcohol with methylviologen covalently attached at the end of side chains attached to approximately 5% of the hydroxyl groups originally present. That corresponds to about 175 methylviologen groups per PVA molecule.

This PVA-MV was precipitated by pouring the reaction mixture into ethyl acetate, filtered off and dried overnight under vacuum. Its molecular weight and polydispersity, determined by GPC with water as eluent were Mn=1.5 MDa and PDI=1.25.

Example 6

Formation of a gel using polymers of Examples 4 and 5 above was carried out using the following general method which was similar to that of Example 3.

An aqueous solution was made by dissolving equal weights of CB[8] and the PVA-MV polymer of Example 5 in water (0.75 mL) with sonication for 10 min, The molecular weights of these materials and the proportion of MV guest groups on the polymer were such that the concentrations of MV groups and CB[8] molecules were equal. The water soluble polymer had the effect of aiding dissolution of CB[8] which would not dissolve on its own.

A second solution was made by dissolving the HEC-Np polymer of Example 4 in water (0.75 mL). The second solution was then added to the first solution in a small screw top vial and shaken for approximately 2 seconds to bring about gel formation. These gels contained a lower concentration of inclusion complexes that those in Example 3 and were observed to have a slight red colour.

Comparative experiments were carried out using 0.5 wt % HEC and 0.5 wt % HEC-Np without PVA-MV or CB[8]. It was observed that 0.5 wt % HEC gave some thickening (this is of course a known property of HEC) and that HEC-Np gave approximately equal thickening. However, when 0.1 wt % PVA-MV of Example 5 was included, viscosity increased by about two orders of magnitude and the gels remained in place when the vials were inverted.

Gel formation was carried out with concentrations as in the table below:

| HEC-Np | PVA-MV | CB[8] |
|---|---|---|
| 1.5 wt % | 0.3 wt % | 0.3 wt % |
| 1 wt % | 0.2 wt % | 0.2 wt % |
| 0.5 wt % | 0.1 wt % | 0.1 wt % |
| 0.5 wt % | 0.05 wt % | 0.05 wt % |

-continued

| HEC-Np | PVA-MV | CB[8] |
|---|---|---|
| 0.25 wt % | 0.05 wt % | 0.05 wt % |

Figure 9:
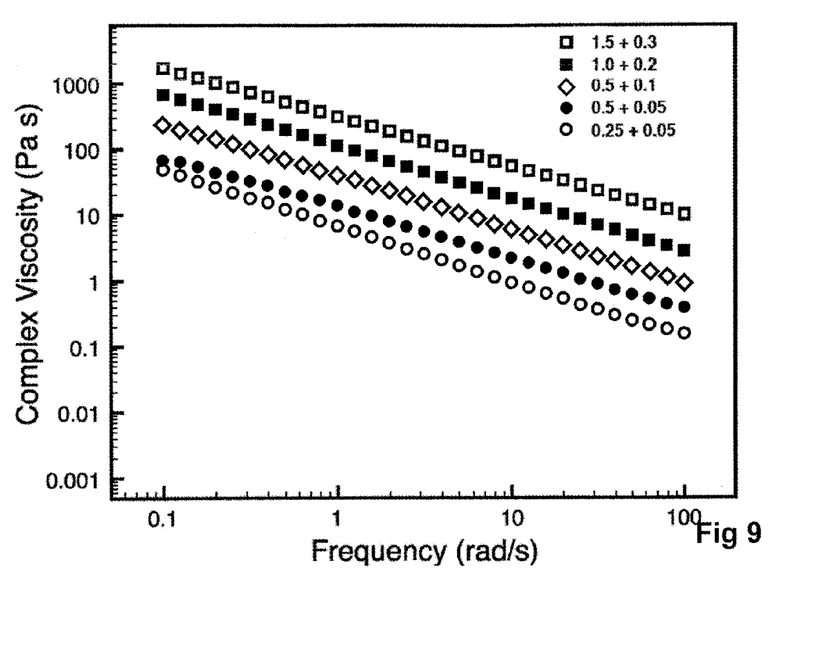
FIG. 9 is a graph of viscosities of cross-linked gels plotted against shear rate as determined in a dynamic oscillatory frequency sweep at constant 25° C.
Figure 10:
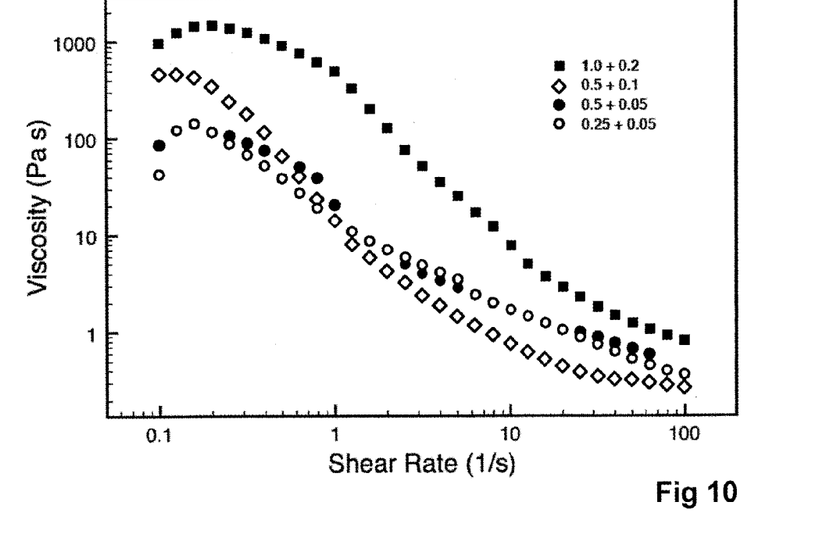
FIG. 10 is a graph of viscosities of cross-linked gels plotted against shear rate as determined in a steady shear sweep at constant 25° C.

Viscosities were observed by dynamic oscillatory frequency sweep in which the shear applied to the gel causes very little strain at 25° C. and are shown in FIG. 9. For some gels viscosities were also measured in a steady shear sweep: the results are shown in FIG. 10 (with some values for 0.5 wt % HEC-Np and 0.05 wt % MV omitted because they were obscured by values with 0.025 wt % HEC-Np) and show that the gels exhibited slight thickening as the lowest shear was increased slightly, but then became strongly shear thinning as shear is increased. It was observed that when the application of shear was stopped, the viscosity recovered very quickly. The recovery time was observed to be less than 10 seconds.

Figure 11:
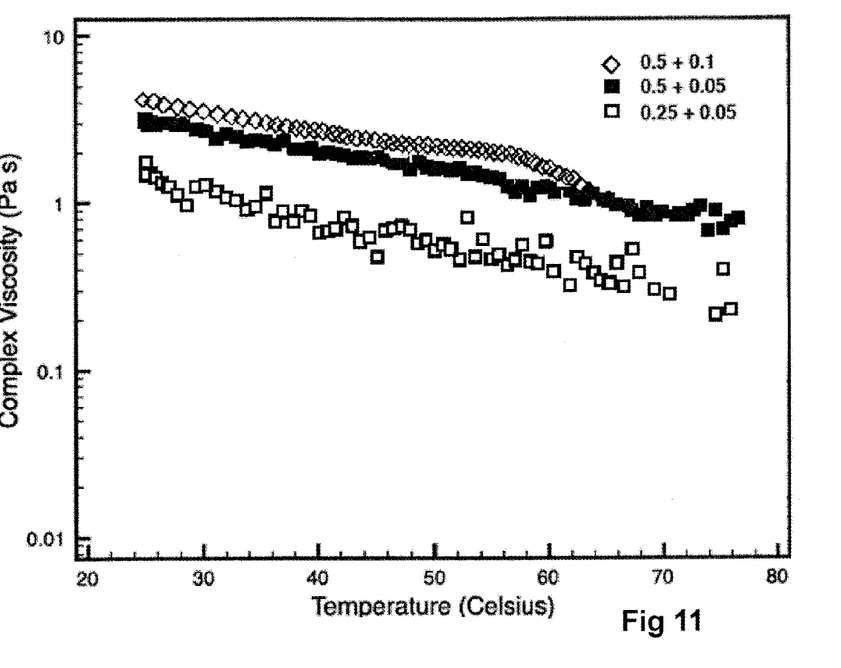
FIG. 11 is a graph of viscosities at constant shear and rising temperature.

The viscosity of some gels was also observed under a constant shear rate of 10 rad/sec as temperature was raised from 25 to 75° C. The results are shown in FIG. 11 (some values with 0.5 wt % HEC-Np and 0.1 wt % PVA-MV coincided with values with 0.5 wt % HEC-Np and 0.0.5 wt % PVA-MV and have been omitted). It was observed that there was some change as temperature rose, but the drop in viscosity was only about half an order of magnitude, indicating that supramolecular polymers persisted over the temperature range.

Example 7

Biedermann et al, referred to above, describes the functionalisation of a number of compounds with isocyanate groups. Several such isocyanate-functionalised compounds were used to attach second guest groups to HEC by the procedure of Example 4. Second guest groups attached to HEC in this way were:

4-phenylazophenyl

Methoxydibenzofuran

Pyrene and also 1-naphthyl, using commercially available 1-naphthylisocyanate.

In each case it was found that viscous gels could be formed using PVA-MV and CB[8] in accordance with the procedure of Example 6. Numerous other aromatic compounds can be functionalized with isocyanate in the same way and so are available as second guest groups. Possibilities include methoxynaphthyl, anthracenyl, dibenzocyclopentadienyl and 4-phenyl-phenyl.

An alternative to methylviologen is the group in which the pyridinium rings are connected through an ethylene group rather than connected directly. Initial investigation of the properties of this group indicate that it associates with CB[8] slightly more strongly than methylviologen.

Example 8

The procedure of Example 3 was used to make gels using 0.5 wt % HEC-Np according to Example 4 and a solution containing 0.1 wt % copolymer 2b from Example 1 together with 0.08 wt % CB[8]. It was found that viscous gels were formed. This is a much lower concentration than the 5 wt % polymer concentration used in Example 3 although slightly higher than the minimum concentration of 0.25 wt % HEC-Np used in Example 6.

Figure 12:
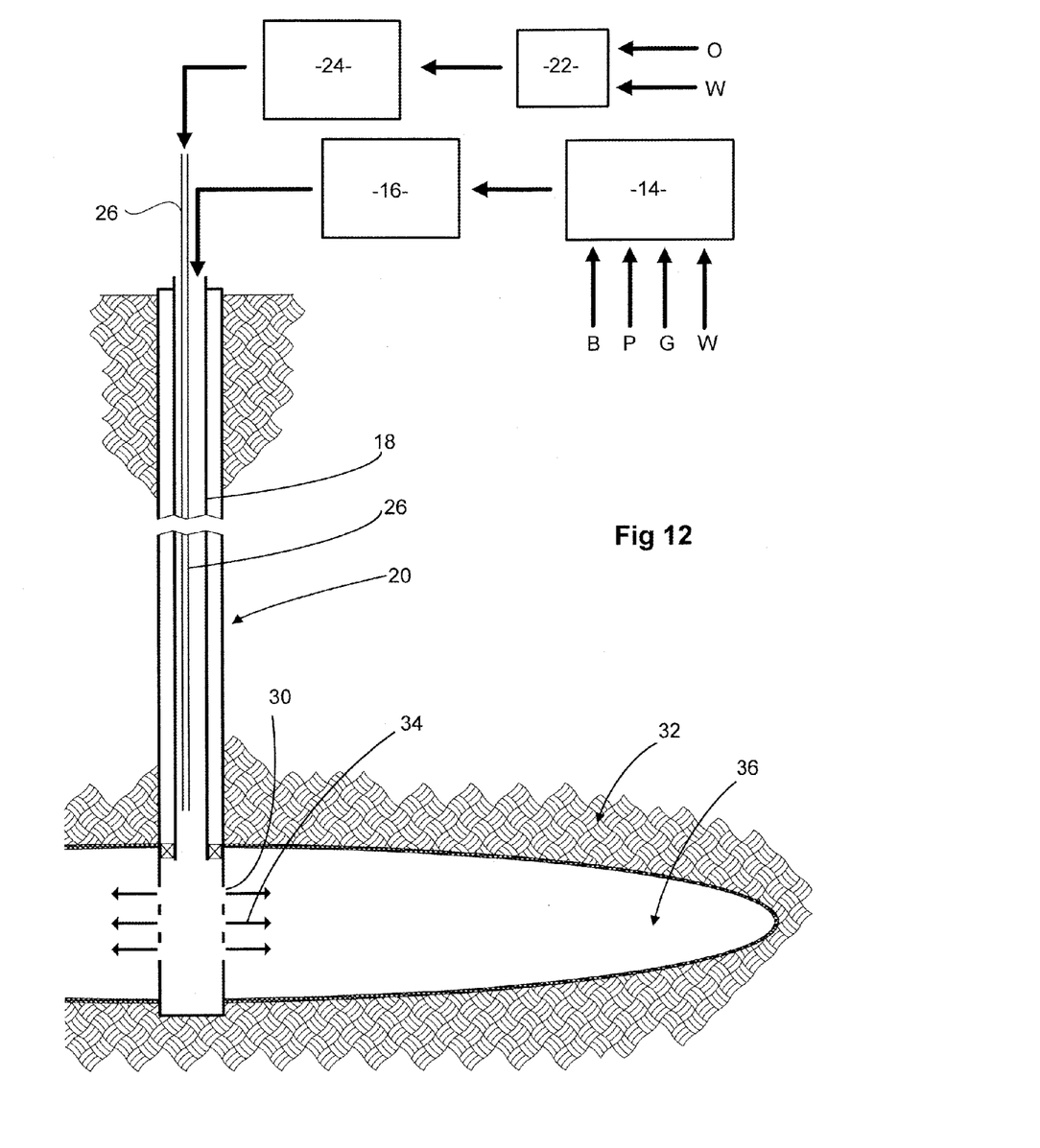
FIG. 12 illustrates the use of the invention in fracturing.
Figure 13:
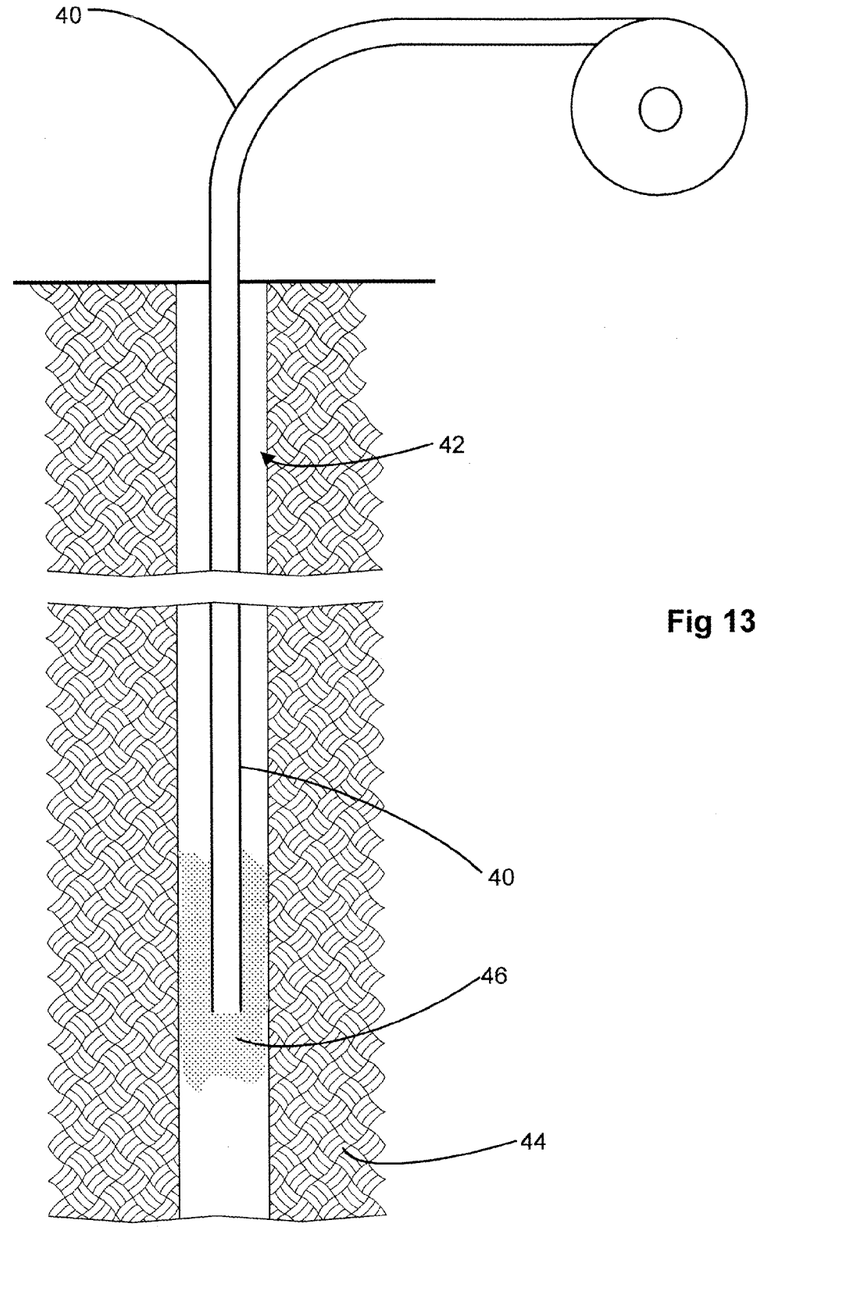
FIG. 13 illustrates the use of the invention to form a plug in a wellbore.

FIGS. 12 and 13 illustrate and exemplify use of some embodiments of the method of this invention. FIG. 12 shows diagrammatically one possible arrangement when a fracturing job is carried out. A mixer 14 is supplied with water, a polysaccharaide which has naphthyl guest groups attached such as HEC-Np or chemically modified guar which incorporates side chains containing naphthyl guest groups attached through cleavable functional groups, particulate proppant and an oxidative breaker as indicated by arrows W, G, P and B. The mixer 14 delivers a mixture of these materials to pumps 16 which pump the mixture under pressure down the production tubing 18 of a wellbore 20. A second stream of liquid is formed from a smaller quantity of water, CB[8] and a polymer incorporating methylviologen guest groups. These are supplied to a second mixer 22 as denoted by arrows W and O. Pumps 24 drive this fluid stream down a tube 26 located within the production tubing 18 and from the lower end of which it exits into the flow within tubing 18. The mixed streams then pass through perforations 30 into the reservoir formation 32 as indicated by the arrows 34 at the foot of the well.

When then two streams merge downhole, host-guest interactions take place, and the CB[8] host molecules combine with both guest molecules, crosslinking them so that the viscosity of the mixture increases and is viscous when it has passed through the perforations 30 into the fracture 36. The viscosity is later reduced as the breaker attacks the polysaccharide cahin and/or links by which the naphthyl groups are attached to the guar.

FIG. 13 illustrates the use of coiled tubing 40 to form a plug within a wellbore 42 drilled through formation 44. A quantity of aqueous carrier liquid containing polymer which has methylviologen guest groups attached is pumped down the tubing and remains located around the tubing exit as indicated by a dot pattern at 44. Next, carrier liquid containing CB[8] and a second polymer with naphthyl guest groups attached is pumped down tube 40. At the same time the tube 40 is slowly raised, so that the liquid is discharged into and mixes with the liquid 44 placed earlier. As the two liquids mix, host-guest interactions occur and a plug of very viscous, crosslinked gel forms within this part of the wellbore 42.

The invention claimed is:

1. A method of delivering wellbore fluid below ground, comprising supplying, underground, an aqueous carrier liquid, cucurbituril 8 molecules each providing a host cavity and guest molecules each comprising at least two guest groups, wherein at least one of the guest molecules comprises a polymer chain, where the cucurbituril 8 and guest molecules attach together through reception of guest groups within cucurbituril 8 host cavities, thereby forming extended polymer chains and providing a viscosity enhancing polymer within the carrier liquid.

2. The method according to claim 1 wherein the combination of cucurbituril 8 and guest molecules is supplied as separate parts to an underground location where the separate parts mix and the inclusion complex is formed underground.

3. The method according to claim 1 including supplying the carrier liquid, the cucurbituril 8 molecules and the guest molecules via a well bore from the surface to an underground location.

4. The method according to claim 3 comprising supplying the cucurbituril 8 molecules and at least one of the guest molecules along separate pathways within the wellbore.

5. The method according to claim 3 comprising supplying either the cucurbituril 8 molecules or at least one of the guest molecules in an encapsulated form from which it is released into the carrier liquid while underground.

6. The method according to claim 1 which is a method of hydraulic fracturing, the wellbore fluid being a fracturing fluid pumped under pressure to cause fracturing of a subterranean formation.

7. The method according to claim 6 wherein at least part of the fracturing fluid has particulate proppant suspended therein.

* * * * *